US010909317B2

(12) United States Patent
Huang et al.

(10) Patent No.: US 10,909,317 B2
(45) Date of Patent: Feb. 2, 2021

(54) BLOCKCHAIN-BASED TEXT SIMILARITY DETECTION METHOD, APPARATUS AND ELECTRONIC DEVICE

(71) Applicant: Advanced New Technologies Co., Ltd., Grand Cayman (KY)

(72) Inventors: Kaiming Huang, Hangzhou (CN); Lei Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/782,938

(22) Filed: Feb. 5, 2020

(65) Prior Publication Data

US 2020/0250374 A1 Aug. 6, 2020

Related U.S. Application Data

(63) Continuation of application No. PCT/CN2020/072148, filed on Jan. 15, 2020.

(30) Foreign Application Priority Data

Jul. 26, 2019 (CN) .......................... 2019 1 0683370

(51) Int. Cl.
*G10L 15/00* (2013.01)
*G10L 15/08* (2006.01)
(Continued)

(52) U.S. Cl.
CPC ........ *G06F 40/247* (2020.01); *G06F 16/1837* (2019.01); *G06F 40/289* (2020.01); *H04L 9/0637* (2013.01)

(58) Field of Classification Search
CPC ............... G06F 16/248; G06F 21/6245; G06F 16/3331; G06F 16/367; G06F 17/20; G06N 20/00; G06N 5/003; G06N 7/005
See application file for complete search history.

(56) References Cited

U.S. PATENT DOCUMENTS 10,095,992 B1 * 10/2018 Brestoff ............... G06Q 10/107
10,592,555 B1 * 3/2020 Zhang ............... G06F 16/90344
(Continued)

FOREIGN PATENT DOCUMENTS

| CN | 106649221 | 5/2017 |
| CN | 107832306 | 3/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Olumjimi A Adesanya
(74) *Attorney, Agent, or Firm* — Fish & Richardson P.C.

(57) ABSTRACT

A computer-implemented method, non-transitory, computer-readable medium, and computer-implemented system are provided for detecting text similarity. A smart contract for detecting a similarity to a target original text is deployed in a blockchain network. The method is performed by a network node in the blockchain network. A first transaction, including first text, is received, where the first text is text whose similarity to the target original text is to be detected. The smart contract is invoked and text similarity detection logic stated in the smart contract is executed to obtain a detection result of similarity between the first text and the target original text.

12 Claims, 5 Drawing Sheets

(51) Int. Cl.
*G06F 17/27* (2006.01)
*G06F 40/247* (2020.01)
*G06F 16/182* (2019.01)
*G06F 40/289* (2020.01)
*H04L 9/06* (2006.01)

(56) References Cited

U.S. PATENT DOCUMENTS

| | | | | |
|---|---|---|---|---|
| 2017/0075877 | A1* | 3/2017 | Lepeltier | G06F 40/205 |
| 2018/0261118 | A1* | 9/2018 | Morris | G09B 7/02 |
| 2019/0057145 | A1* | 2/2019 | Huang | G06N 20/00 |
| 2019/0179951 | A1 | 6/2019 | Brunet et al. | |
| 2019/0228025 | A1* | 7/2019 | Chapman | G06F 16/27 |
| 2019/0294999 | A1* | 9/2019 | Guttmann | G06K 9/6219 |
| 2019/0349321 | A1* | 11/2019 | Cai | G06N 3/006 |
| 2019/0354887 | A1* | 11/2019 | Subramanian | G06F 16/9024 |

FOREIGN PATENT DOCUMENTS

| | | |
|---|---|---|
| CN | 107832384 | 3/2018 |
| CN | 107992470 | 5/2018 |
| CN | 108550041 | 9/2018 |
| CN | 108920633 | 11/2018 |
| CN | 109002693 | 12/2018 |
| CN | 109086577 | 12/2018 |
| CN | 109597878 | 4/2019 |
| CN | 109614775 | 4/2019 |
| CN | 109615383 | 4/2019 |
| CN | 109697367 | 4/2019 |
| CN | 110019216 | 7/2019 |
| CN | 110046480 | 7/2019 |
| CN | 110472201 | 11/2019 |
| WO | WO 2019019678 | 1/2019 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln. No. PCT/CN2020/072148, dated Apr. 28, 2020, 9 pages (full machine translation).

Wang, "Design and Implementation of the Manuscript Review System Based on Blockchain," China Master's Theses Full-Text Database—Information Technology, Feb. 2019, pp. 1-75 (full machine translation).

* cited by examiner

BLOCKCHAIN-BASED TEXT SIMILARITY DETECTION METHOD, APPARATUS AND ELECTRONIC DEVICE

CROSS-REFERENCE TO RELATED APPLICATIONS

This application is a continuation of PCT Application No. PCT/CN2020/072148, filed on Jan. 15, 2020, which claims priority to Chinese Patent Application No. 201910683370.2, filed on Jul. 26, 2019, and each application is hereby incorporated by reference in its entirety.

TECHNICAL FIELD

One or more implementations of the present specification relate to the field of blockchain technologies, and in particular, to a blockchain-based text similarity detection method, apparatus and electronic device.

BACKGROUND

A blockchain technology, also referred to as a distributed ledger technology, is an emerging technology that several computing devices participate in "accounting" to jointly maintain a complete distributed database. The blockchain technology is characterized by decentralization, openness, and transparency, and also, in the blockchain technology, each computing device can participate in database recording, and data can be synchronized rapidly between the computing devices. Therefore, the blockchain technology has been widely applied to many fields.

SUMMARY

In view of this, one or more implementations of the present specification provide a blockchain-based text similarity detection method and apparatus, a computer device, and a computer-readable storage medium.

To achieve the previously described objective, one or more implementations of the present specification provide a blockchain-based text similarity detection method, applied to a blockchain network in which a smart contract for detecting a similarity to a target original text is deployed, where the method is performed by a network node in the blockchain network, and includes the following: receiving a first transaction including a first text, where the first text is a text whose similarity to the target original text is to be detected; and invoking the smart contract, and executing text similarity detection logic stated in the smart contract, to obtain a detection result of similarity between the first text and the target original text.

In another shown implementation, the first text includes at least one first text unit of a predetermined length; the smart contract stores several target text vectors, and each target text vector is generated based on a target text unit of the predetermined length included in the target original text; and the executing text similarity detection logic stated in the smart contract includes the following: generating at least one first text vector for the at least one first text unit; calculating a distance between the at least one first text vector and each target text vector; and comparing the distance with a predetermined distance threshold, where when the distance is less than the predetermined distance threshold, a similarity detection result of the at least one first text unit is "similar", and the detection result of similarity between the first text and the target original text includes the similarity detection result of the at least one first text unit.

In another shown implementation, target text vector indices are generated for the several target text vectors in the smart contract.

In another shown implementation, the method further includes the following: obtaining a second text including at least one similar first text unit, where the similar first text unit is a first text unit whose similarity detection result is "similar"; dividing the second text into a plurality of second text units of the predetermined length; sending a second transaction including the second text units to the blockchain network, to invoke the smart contract and execute the text similarity detection logic stated in the smart contract, to obtain a detection result of similarity between each second text and the target original text; and calculating a similarity between the second text and the target original text based on a second text unit whose similarity detection result is "similar".

In another shown implementation, the calculating a similarity between the second text and the target original text based on a second text unit whose similarity detection result is "similar" includes the following: calculating a ratio of a content sum of second text units whose similarity detection results are "similar" to total content of the second text or a ratio of a content sum of second text units whose similarity detection results are "similar" to total content of the target original text, and using the ratio as the similarity between the second text and the target original text.

In another shown implementation, when the similarity between the second text and the target original text is greater than a predetermined similarity threshold, the method further includes the following: sending an evidence storage transaction to the blockchain network, where the evidence storage transaction includes the second text and source information of the second text.

Correspondingly, the present specification further provides a blockchain-based text similarity detection apparatus, applied to a blockchain network in which a smart contract for detecting a similarity to a target original text is deployed, where the apparatus is applied to a network node in the blockchain network, and includes the following: a receiving unit, configured to receive a first transaction including a first text, where the first text is a text whose similarity to the target original text is to be detected; and an execution unit, configured to invoke the smart contract, and execute text similarity detection logic stated in the smart contract, to obtain a detection result of similarity between the first text and the target original text.

In another shown implementation, the first text includes at least one first text unit of a predetermined length; the smart contract stores several target text vectors, and each target text vector is generated based on a target text unit of the predetermined length included in the target original text; and the executing text similarity detection logic stated in the smart contract includes the following: generating at least one first text vector for the at least one first text unit; calculating a distance between the at least one first text vector and each target text vector; and comparing the distance with a predetermined distance threshold, where when the distance is less than the predetermined distance threshold, a similarity detection result of the at least one first text unit is "similar", and the detection result of similarity between the first text and the target original text includes the similarity detection result of the at least one first text unit.

In another shown implementation, target text vector indices are generated for the several target text vectors in the smart contract.

In another shown implementation, the apparatus further includes the following: an acquisition unit, configured to obtain a second text including at least one similar first text unit, where the similar first text unit is a first text unit whose similarity detection result is "similar"; a division unit, configured to divide the second text into a plurality of second text units of the predetermined length; a sending unit, configured to send a second transaction including the second text units to the blockchain network, to invoke the smart contract and execute the text similarity detection logic stated in the smart contract, to obtain a detection result of similarity between each second text and the target original text; and a calculation unit, configured to calculate a similarity between the second text and the target original text based on a second text unit whose similarity detection result is "similar".

In another shown implementation, the calculation unit is further configured to calculate a ratio of a content sum of second text units whose similarity detection results are "similar" to total content of the second text or a ratio of a content sum of second text units whose similarity detection results are "similar" to total content of the target original text, and use the ratio as the similarity between the second text and the target original text.

In another shown implementation, when the similarity between the second text and the target original text is greater than a predetermined similarity threshold, the sending unit is further configured to send an evidence storage transaction to the blockchain network, where the evidence storage transaction includes the second text and source information of the second text.

Correspondingly, the present specification further provides a computer device, including a storage and a processor. The storage stores a computer program that can be run by the processor, and when the processor runs the computer program, the blockchain-based text similarity detection method in the previous implementations is performed.

Correspondingly, the present specification further provides a computer-readable storage medium. The computer-readable storage medium stores a computer program, and when the computer program is run by a processor, the blockchain-based text similarity detection method in the previous implementations is performed.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described below do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that in other implementations, steps in a corresponding method are not necessarily performed based on the sequence shown and described in the present specification. In some other implementations, the method can include more or fewer steps than those described in the present specification. In addition, a single step described in the present specification can be divided into a plurality of steps in other implementations for description. However, a plurality of steps described in the present specification can also be combined into a single step for description in other implementations.

With the popularization of the Internet and the reduction of content plagiarism costs, more original Internet content is affected by illegal infringement, which not only causes great economic loss to the creator, but also affects the innovation motivation of the whole society. In addition, plagiarists use synonym replacements or "text laundering" tools, making infringement detection more difficult.

For example, Internet text content infringement detection is usually performed by directly comparing text content to obtain a degree of overlap between words in two articles. The method of directly comparing text content has obvious disadvantages: When there is a slight change between text content of an original article and text content of a plagiarizing article, the slight change cannot be detected. For example, a hash value of text content of original article A is md5_A, and a hash value of text content of a plagiarizing article becomes different from md5_A provided that one character is changed. Therefore, it is very difficult to detect a degree of overlap between the plagiarizing article and the original article.

In addition, in existing text infringement detection or text similarity detection, text or electronic evidence of a detected infringing text is usually stored in a notary office, and a time window from detection to evidence storage is relatively long. Therefore, the evidence is likely to be denied or eliminated by a potential infringer.

In view of this, the present specification provides a blockchain-based text similarity detection method, applied to a blockchain network in which a smart contract for detecting a similarity to a target original text is deployed.

The blockchain network described in one or more implementations of the present specification can be a peer-to-peer (P2P) network system with a distributed data storage structure that is implemented by network nodes through a consensus mechanism. Data in the blockchain is distributed in "blocks" connected in time. A current block can include a data digest of a previous block, and data of all or some of the nodes is backed up based on different specific consensus mechanisms (for example, proof of work (POW), proof of stake (POS), delegated proof of stake (DPOS), or practical byzantine fault tolerance (PBFT)).

Real data generated in the physical world can be formed into a standard transaction format supported by the blockchain, and then published in the blockchain network. Network nodes in the blockchain network perform consensus processing on the received transaction. After a consensus is reached, a network node serving as an accounting node in the blockchain network packs the transaction into a block and persistently stores the transaction in the blockchain network.

Consensus algorithms supported in the blockchain can include a first-type consensus algorithm and a second-type consensus algorithm.

The first-type consensus algorithm is a consensus algorithm that network nodes need to compete for accounting rights in each accounting cycle, for example, POW, POS, or DPOS.

The second-type consensus algorithm is a consensus algorithm that elects an accounting node for each accounting cycle in advance (no need to compete for accounting rights), for example, PBFT.

In a blockchain network using the first-type consensus algorithm, network nodes that compete for the accounting rights can execute a transaction after receiving the transaction. One of the network nodes that compete for the accounting rights may win in the current cycle, and becomes the accounting node. The accounting node can pack the received transaction and other transactions together to generate the latest block, and send the generated latest block or a block header of the latest block to other network nodes for consensus.

In a blockchain network using the second-type consensus algorithm, a network node with the accounting rights was agreed upon before the current accounting cycle. Therefore, after receiving the transaction, a network node can send the transaction to the accounting node if the network node is not the accounting node of the current cycle. The accounting node of the current cycle can execute the transaction when or before the transaction is packed with other transactions to generate the latest block. After generating the latest block, the accounting node can send the latest block or the block header of the latest block to other network nodes for consensus.

As described above, regardless of which consensus algorithm is used in the blockchain network, the accounting node of the current cycle can pack the received transaction to generate the latest block, and send the latest block or the block header of the latest block to other network nodes for consensus verification. If the other network nodes verify that there is no problem after receiving the latest block or the block header of the latest block, the other network nodes can append the latest block to the end of the current blockchain, to complete the accounting process in the blockchain network. When performing verification on a new block or a block header sent by the accounting node, another node can also execute a transaction included in the block.

A person skilled in the art knows that a blockchain network system runs in a corresponding consensus mechanism, data that has been recorded into a blockchain database is difficult to be tampered with by any node. For example, in a blockchain network using a PoW consensus, existing data can be tampered with by attack with at least 51% hash power of the entire network. Therefore, the blockchain system has the characteristics of ensuring data security and preventing attack and tampering over other centralized database systems. It can be seen that data recorded into a distributed database of the blockchain is not attacked or tampered with, thereby ensuring authenticity and reliability of data information stored in the distributed database of the blockchain.

For example, blockchain networks can include a public blockchain network, a private blockchain network, and a consortium blockchain network. Although the term "blockchain network" is usually associated with a bitcoin cryptocurrency network, the blockchain network used here can be a distributed ledger system (DLS) that does not refer to any particular case.

In the public blockchain network, a consensus process is controlled by nodes in a consensus network. For example, hundreds, thousands, and even millions of entities can collaborate in the public blockchain network, with each entity operating at least one node in the public blockchain network. Therefore, the public blockchain network can be considered as a public network relative to participating entities. For example, the public blockchain network includes a bitcoin network. The bitcoin network is a peer-to-peer payment network. The bitcoin network uses a distributed ledger, which is referred to as a blockchain. However, as described above, the term "blockchain" usually refers to a distributed ledger that does not specifically refer to a bitcoin network.

Generally, the public blockchain network supports public transactions. Public transactions are shared by all nodes in the public blockchain network and stored in a global blockchain. The global blockchain is a blockchain replicated across all nodes. In other words, for the global blockchain, all nodes are in a fully consistent state. To reach a consensus (for example, to agree to add a block to a blockchain), a consensus protocol is used in the public blockchain network. Example consensus protocols include but are not limited to PoW implemented in the bitcoin network.

Generally, the private blockchain network is provided to a specific entity, and the specific entity centrally controls read and write permission. The entity controls which nodes can participate in the blockchain network. Therefore, the private blockchain network is usually referred to as a licensing network, which imposes restrictions on who is allowed to participate in the network and a participation level (e.g., only in some transactions). Various types of access control mechanisms can be used (e.g., existing participants vote to add new entities and regulators can control access).

Generally, the consortium blockchain network is private for participating entities. In the consortium blockchain network, a consensus process is controlled by a group of nodes (consortium member nodes) authorized, and one or more nodes are operated by a corresponding entity (e.g., an enterprise). For example, a consortium of 10 entities (e.g., enterprises) can operate the consortium blockchain network, and each entity operates at least one node in the consortium blockchain network. Therefore, the consortium blockchain network can be considered a private network for participating entities. In some examples, each entity (node) must sign each block, so that the block is valid and a valid block is added to a blockchain. In some examples, subsets of at least entities (nodes) (e.g., at least seven entities) must sign each block, so that the block is valid and a valid block is added to a blockchain.

It can be expected that the implementations provided in the present specification can be implemented in any suitable type of blockchain network.

In practice, a smart contract can be provided in the public blockchain, the private blockchain, and the consortium blockchain. A smart contract in a blockchain is a contract that can be triggered by a transaction in the blockchain. The smart contract can be defined in a form of code.

Taking Ethereum as an example, users can create and invoke some complex logics in an Ethereum network. As a programmable blockchain, the core of Ethereum is an Ethereum virtual machine (EVM), and each Ethereum node can run the EVM. The EVM is a Turing-complete virtual machine, through which various types of complex logic can be implemented. The smart contract published or invoked by a user in Ethereum can be run by the EVM. Actually, virtual machine code (virtual machine byte code, referred to as "byte code" below) is directly run on the EVM, and therefore, a smart contract deployed in a blockchain network can be byte code.

Figure 1:
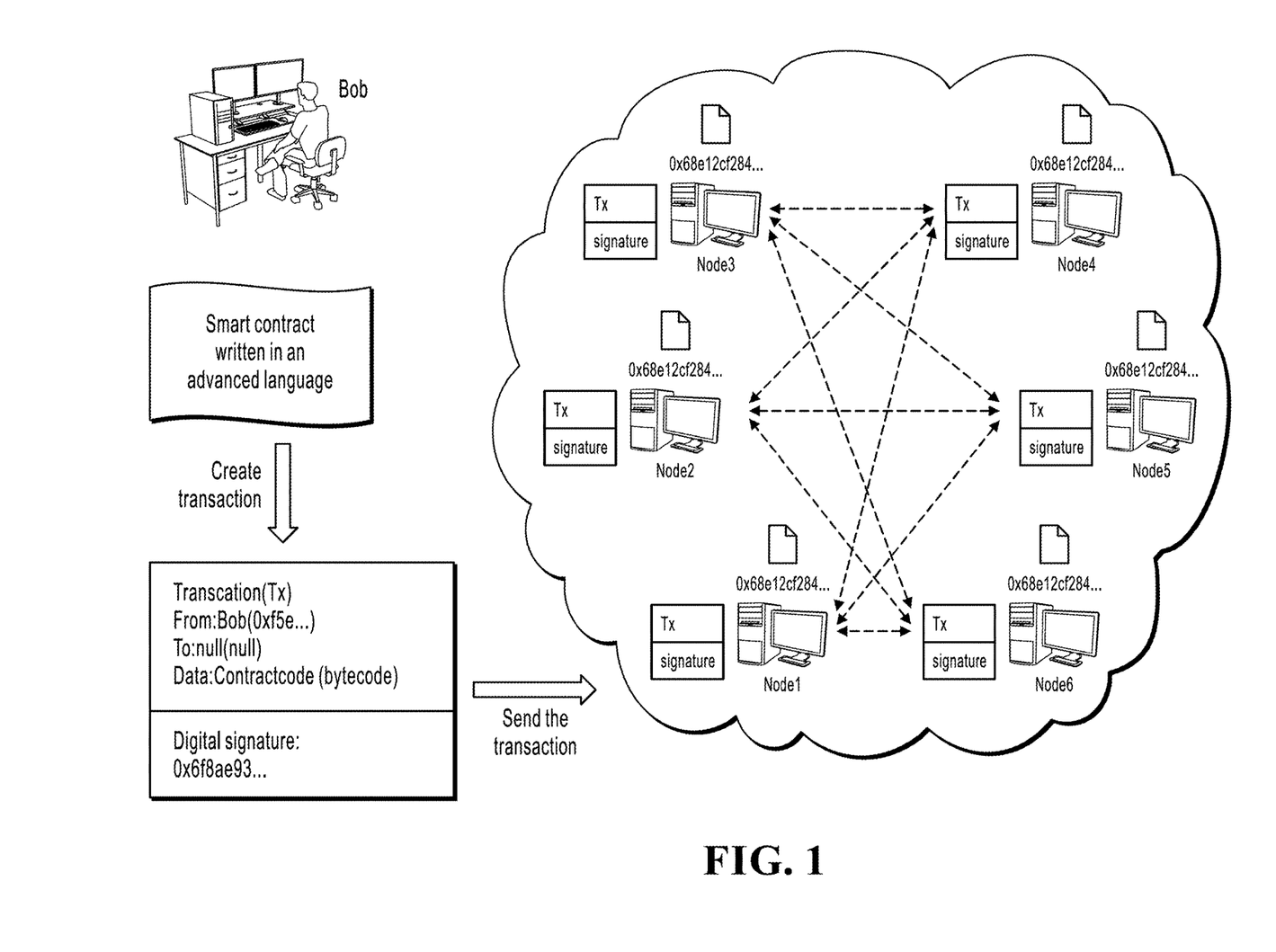
FIG. 1 is a schematic diagram illustrating creation of a smart contract, according to an example implementation.

As shown in FIG. 1, after Bob sends a transaction including information about creating a smart contract to the Ethereum network, each node can execute the transaction in the EVM. In the figure, the FROM field of the transaction is used to record an address of an account that initiates creation of the smart contract, contract code stored in a field value of the DATA field of the transaction can be byte code, and a field value of the TO field of the transaction is a null account. After nodes reach a consensus by using a consensus mechanism, the smart contract is successfully created, and then a user can invoke the smart contract.

After the smart contract is created, a contract account corresponding to the smart contract appears in the blockchain network and has a specific address. For example, "0x68e12cf284 . . . " in each node in FIG. 1 represents the address of the contract account created, and contract code and account storage will be stored in account storage of the contract account. Behavior of the smart contract is controlled by the contract code, and a contract state is stored in the account storage of the smart contract. In other words, a virtual account including contract code and account storage is generated in the blockchain network by using the smart contract.

As mentioned above, a DATA field of a transaction including creating a smart contract can store byte code of the smart contract. The byte code includes a series of bytes. Each byte can identify one operation. Considering development efficiency, readability, etc., developers may not write byte code directly, but choose an advanced language to write smart contract code. For example, advanced languages can be Solidity, Serpent, and LLL. Smart contract code written in an advanced language can be compiled by using a compiler, to generate byte code that can be deployed in a blockchain network.

Taking the Solidity language as an example, contract code written in the Solidity language is similar to class in an object-oriented programming language. A plurality of members can be stated in a contract, including a state variable, a function, a function modifier, an event, etc. The state variable is a value that is permanently stored in an ACCOUNT STORAGE field of a smart contract and is used to store a contract state.

Figure 2:
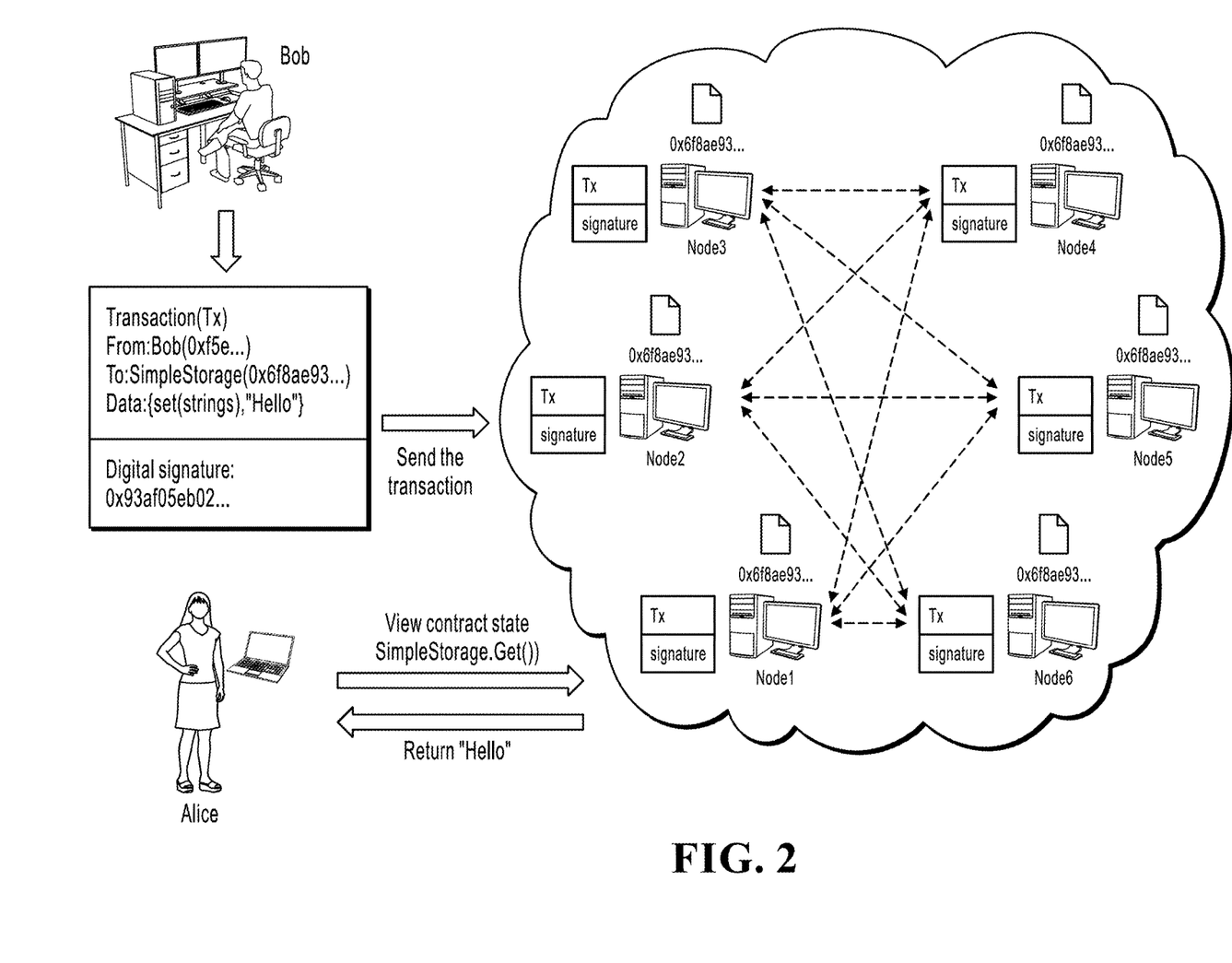
FIG. 2 is a schematic diagram illustrating invocation of a smart contract, according to an example implementation.

As shown in FIG. 2, still using Ethereum as an example, after Bob sends a transaction including information about invoking a smart contract to an Ethereum network, each node can execute the transaction in the EVM. In the figure, the FROM field of the transaction is used to record an address of an account that initiates invocation of the smart contract, the TO field is used to record an address of the invoked smart contract, and the DATA field of the transaction is used to record a method and a parameter for invoking the smart contract. After the smart contract is invoked, an account state of the contract account can change. Subsequently, a client can view the account state of the contract account by using an accessed blockchain node.

A smart contract can be executed independently on each node in a blockchain network in a specified way, and all execution records and data are stored in the blockchain network. Therefore, after such a transaction is executed, transaction vouchers that cannot be tampered with and will not be lost are stored in the blockchain network.

Figure 3:
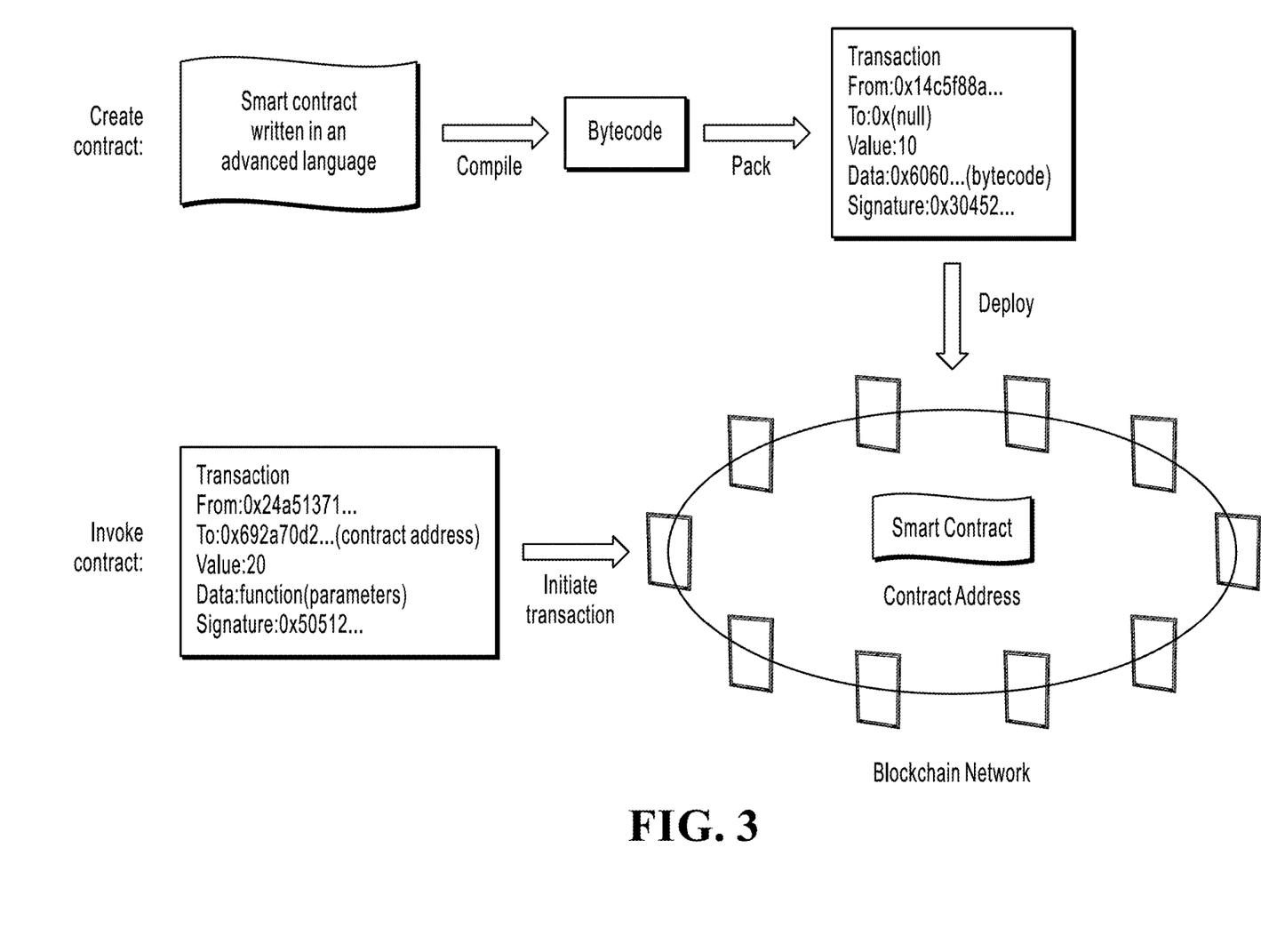
FIG. 3 is a schematic diagram illustrating creation and invocation of a smart contract, according to an example implementation.

FIG. 3 is a schematic diagram illustrating creation and invocation of a smart contract. To create a smart contract in Ethereum, processes such as writing a smart contract, generating byte code, and deploying the byte code in a blockchain network are needed. Invoking a smart contract in Ethereum is initiating a transaction relating to an address of the smart contract. The transaction can be executed in an EVM of each node, and smart contract code is distributed and run on a virtual machine of each node in the Ethereum network.

The smart contract provided in one or more implementations of the present specification is used to detect a similarity between any text and a target original text. An account of the smart contract can store full-text content of the target original text or processed index content in a plurality of forms corresponding to the full-text content, so that comparison becomes easier.

Figure 4:
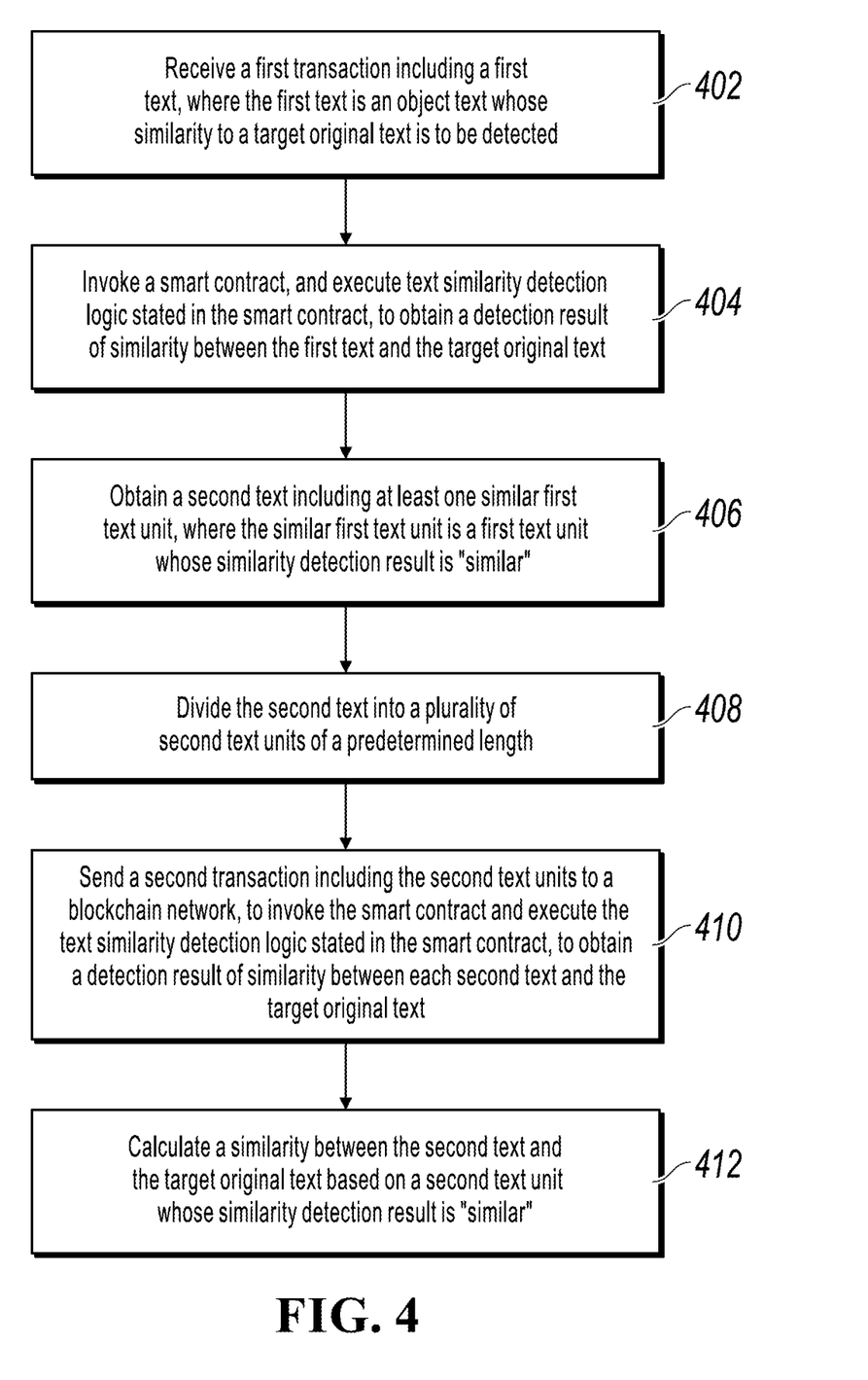
FIG. 4 is a schematic flowchart illustrating a blockchain-based text similarity detection method, according to an example implementation.

FIG. 4 illustrates procedures and steps in a blockchain-based text similarity detection method according to an example implementation of the present specification. The method steps can be performed by any network node in a blockchain network, and include the following:

Step 402: Receive a first transaction including a first text, where the first text is a text whose similarity to a target original text is to be detected.

In this implementation, the first transaction is a transaction for invoking a smart contract. As described above, in addition to the first text whose similarity to the target original text is to be detected, the first transaction can include content such as an address, a name of a called function, or a parameter of the invoked smart contract. An identity of a party sending the first transaction is not limited in this implementation, and any network node that has the right to invoke the smart contract in the blockchain network can send the first transaction to the blockchain network.

The first transaction may not only be used to invoke the smart contract, but a person skilled in the art should understand that, after the first transaction is recorded into a distributed database of the blockchain network through consensus verification, a blockchain-based tampering prevention mechanism can provide an evidence storage function for first text content included in the first transaction.

Step 404: Invoke the smart contract, and execute text similarity detection logic stated in the smart contract, to obtain a detection result of similarity between the first text and the target original text.

A series of executable program codes are stated in the smart contract, and can be executed on an EVM of a blockchain network node. Because the smart contract can be invoked and executed at any time after being deployed in the blockchain network, efficiency of detecting the similarity between the first text and the target original text is greatly improved. In addition, any change of the smart contract is traceable in the blockchain network. Therefore, there is a decentralization feature and a relatively low risk of human intervention, and network nodes in the blockchain network can accurately execute the smart contract and obtain an execution result through consensus. Invoking the smart contract to perform text similarity detection can achieve a fairer and more accurate execution result compared with a centralized detection program that can be subject to human intervention.

A specific logical step included in the text similarity detection logic stated in the smart contract is not limited in this implementation. A person skilled in the art can design suitable text similarity detection logic for the target original text based on an actual service requirement.

In a shown implementation, the text similarity detection logic can include: separately generating simhash signatures for the target original text and the first text by using a similarity algorithm, for example, a simhash algorithm through processes such as word segmentation, hashing, weighting, combination, and dimensionality reduction. Because the similarity is higher if characters of the two texts are close in the simhash algorithm, two simhash values can be compared to obtain the similarity between the two texts. The text similarity detection logic can provide an appreciable detection effect for plagiarism of a large section and a small part of content modification. However, the text similarity detection logic produces a worse effect for scenarios where synonym replacements are used many times, and paragraphs of an article are concatenated, or the like.

In another shown implementation, the first text includes at least one first text unit of a predetermined length; and the smart contract stores several target text vectors, and each target text vector is generated based on a target text unit of the predetermined length included in the target original text.

A specific representation form of the predetermined length is not limited in this implementation. The predetermined length can be a length of a predetermined text unit such as a natural paragraph or a natural sentence, or can be a length of a predetermined capacity such as a 100 K text capacity, etc. The first text that is to be compared with the target original text includes at least one first text unit of the predetermined length. For example, when the predetermined length is a natural paragraph length, the first text should include at least one first text unit of a natural paragraph length, i.e., at least one natural paragraph. Based on the same predetermined length processing rule, the target original text can be divided into several target text units of the predetermined length. For example, the target original text can be divided into several target text units based on natural paragraphs of the text, and then corresponding target text vectors are generated for the several target text units based on a text vector generation algorithm (e.g., a doc2vec algorithm).

In this implementation, executing the text similarity detection logic stated in the smart contract includes the following (the following logical steps 4042 to 4046 are not shown in FIG. 4):

Step 4042: Generate at least one first text vector for the at least one first text unit.

In the present step, the at least one first text vector is generated for the at least one first text unit by using an algorithm (e.g., the doc2vec algorithm) the same as that used to generate the target text vector.

Step 4044: Calculate a distance between the at least one first text vector and each target text vector.

Methods for calculating the distance between the first text vector and the target text vector include but are not limited to a cosine distance calculation method, a Pearson distance calculation method, a Euclidean distance calculation method, a block distance calculation method, etc.

Step 4046: Compare the distance with a predetermined distance threshold, where when the distance is less than the predetermined distance threshold, a similarity detection result of the at least one first text unit is "similar".

Correspondingly, the detection result of similarity between the first text and the target original text includes the similarity detection result of the at least one first text unit.

In this implementation, for example, a similarity detection process of one first text unit is shown, to explain a specific process of steps 4042 to 4046.

In this example, a target original text contains a natural paragraph: "The roommate looks very bad today, and I feel that he is going to fall immediately after he stands up. It is found through measurement that his temperature is normal. It is too hot, so heat stroke is likely to occur. Drinking green bean soup is useful for treating heat stroke." A first text contains a natural paragraph: "My boyfriend looks very bad in the afternoon, and he cannot stand up and I feel that he is going to fall soon. The temperature is normal at 36 degrees. It is very hot now, so heat stroke is likely to occur. Drinking green bean soup and plum soup is useful for treating heat stroke."

It can be seen that the natural paragraph included in the first text can be obtained by performing text laundering on the natural paragraph included in the target original text. However, neither the direct comparison method nor the simhash algorithm can well reflect a similarity between the two natural paragraphs. In this example, the similarity between the two natural paragraph texts is obtained by calculating a text vector distance.

Before the smart contract provided in this example is published and deployed in the blockchain network, a target text vector corresponding to each natural paragraph can be generated for the target original text including the natural paragraph, with the predetermined length being a natural paragraph length. Or, after the smart contract code is published in the blockchain network, a target text vector generation function is called based on the target original text including the natural paragraph, to generate a target text vector corresponding to each natural paragraph for the target original text including the natural paragraph. Implementations are not limited in the present specification.

A process of generating the target text vector can include the following: preprocessing the target original text, where the preprocessing process can include removing punctuations and performing word segmentation such as removing auxiliary words and stop words of the text; dividing the target original text or the preprocessed target original text based on the predetermined length, to generate target text units, for example, dividing the target original text or the preprocessed target original text into natural paragraphs; and generating target text vectors for the target text units by using a vector generation algorithm.

After the text preprocessing, target text units corresponding to the natural paragraph included in the target original text in the previous example can be: "the roommate looks very bad today feeling that he is going to fall immediately after he stands up it is found through measurement that his temperature is normal it is too hot so heat stroke is likely to occur drinking green bean soup is useful for treating heat stroke". For target text vectors generated for the target text units based on the doc2vec algorithm, references can be made to the second row of data in Table 1.

A processing process of the first text including the natural paragraph by using the smart contract is similar to the previous process. After text preprocessing, first text units corresponding to the natural paragraph included in the first text in the previous example can be: "my boyfriend looks very bad in the afternoon and he cannot stand up and I feel that he is going to fall soon the temperature is normal at 36 degrees it is very hot now so heat stroke is likely to occur drinking green bean soup and plum soup is useful for treating heat stroke". For first text vectors generated for the first text units based on the doc2vec algorithm, references can be made to the third row of data in Table 1.

In this example, a distance between text vectors in the second row and the third row of Table 1 is calculated based on the cosine distance algorithm, and the distance between the first text vectors and the target text vectors is 0.9270391810208355.

When the distance between the vectors is less than the predetermined distance threshold, it can be seen that the similarity detection result of the first text vector is "similar".

In this implementation, an algorithm used to calculate text units (including the target text units and the first text units) of the predetermined length is usually a computer deep learning algorithm such as the doc2vec algorithm, so that the process of generating a text vector is not affected by synonym replacements in text units, and therefore similar text vectors are generated for similar text units. When the distance between the target text vector and the first text vector is less than the predetermined threshold, the target text units corresponding to the target text vectors and the first text units corresponding to the first text vectors are similar texts. Therefore, for text infringement performed by infringers through synonym replacements or text laundering, this implementation can achieve a more accurate similarity detection effect.

It is worthwhile to note that, whether first text units included in the first text come from the same text or different texts is not limited in this implementation. In this implementation, text similarity detection can be performed on the basis of per first text unit.

In this implementation, any network node in the blockchain network can invoke the smart contract based on one or more first text units, to detect a similarity between the one or more first text units and a plurality of target text units included in the target original text. For ease of management, indices can be created for the plurality of target text units included in the target original text by using the smart contract, so that the target text unit is used as a detection unit, thereby improving efficiency and accuracy of text similarity detection.

In the previous implementation, the first text whose similarity to the target original text is to be detected can include only one or several first text units of the predetermined length that are similar to the target original text, and a complete article text that the first text belongs can include more text units that can be considered as similar to the target original text. Therefore, after the first text units that are similar to (the target text units of) the target original text are obtained, network-wide monitoring and acquisition can be performed based on the similar first text units, to obtain a second text including at least one similar first text unit, so that a similarity between second text units of the predetermined length included in the second text and the target original text can be detected, thereby obtaining a result regarding whether a similarity between the second text and the target original text is high enough to affect originality of the second text. The similar first text unit is a first text unit whose similarity detection result is "similar" in the previous implementation.

Therefore, as shown in FIG. 4, the text similarity detection method provided in another implementation further includes the following:

Step 406: Obtain a second text including at least one similar first text unit, where the similar first text unit is a first text unit whose similarity detection result is "similar".

Step 408: Divide the second text into a plurality of second text units of the predetermined length.

To ensure uniformity of similarity comparison, a method for obtaining the second text units of the predetermined length through division can be consistent with the method for obtaining the first text units or the target text units through division.

Step 410: Send a second transaction including the second text units to the blockchain network, to invoke the smart contract and execute the text similarity detection logic stated in the smart contract, to obtain a detection result of similarity between each second text unit and the target original text.

It can be seen from the previous implementation that there can be one or more second transactions. The detection result of similarity between each second text unit and the target original text is obtained based on the process of steps 402 to 404 shown in the previous implementation.

Step 412: Calculate a similarity between the second text and the target original text based on a second text unit whose similarity detection result is "similar".

A specific method for calculating the similarity between the second text and the target original text based on the second text unit whose similarity detection result is "similar" is not limited in this implementation. A person skilled in the art can design an applicable text similarity calculation method for the target original text based on specific factors such as the field of text content, a feature of the text, and a definition of text infringement in the field.

In a shown implementation, the calculating a similarity between the second text and the target original text based on a second text unit whose similarity detection result is "similar" includes the following: calculating a ratio of a content sum of second text units whose similarity detection results are "similar" to total content of the second text, and using the ratio as the similarity between the second text and the target original text. For example, if there are N second text units that are similar to the target original text, and the second text includes a total of M1 paragraphs, the similarity between the second text and the target original text can be N/M1.

Alternatively, a ratio of a content sum of second text units whose similarity detection results are "similar" to total content of the target original text is calculated and used as the similarity between the second text and the target original text. For example, if there are N second text units that are similar to the target original text, and the target original text includes a total of M2 paragraphs, the similarity between the second text and the target original text can be N/M2.

Alternatively, the similarity between the second text and the target original text can be a larger one or a smaller one of the two values N/M1 and N/M2, in other words, the larger one or the smaller one of the two values N/M1 and N/M2 is used as the similarity between the second text and the target original text.

In another shown implementation, an average similarity (or a maximum value of a plurality of similarities between all similar second text units included in the second text and corresponding target text units) can be calculated and used as the similarity between the second text and the target original text. The similarities between the similar second text units and the corresponding target text units can be calculated based on a ratio of a distance between the second text vectors and the corresponding target text vectors to the predetermined distance threshold or a difference between them. Implementations are not limited here.

When the similarity between the second text and the target original text is greater than a predetermined similarity threshold, the second text can be considered as an infringing text. During similarity detection between the second text units included in the second text and the target text units, the smart contract is invoked in the blockchain network based on the second transaction, and evidence for content of the second text units included in the second transaction and a similarity between the content and the target original text has been stored in the blockchain network through consensus verification of network nodes in the blockchain network. As such, the following disadvantage is effectively alleviated: In existing text infringement detection or text similarity detection, a text or electronic evidence of a detected infringing text is usually stored in a notary office, and a time window from detection to evidence storage is relatively long. Therefore, the evidence is likely to be denied or eliminated by a potential infringer.

Still further, in another shown implementation, when the similarity between the second text and the target original text is greater than a predetermined similarity threshold, the method further includes the following: sending an evidence storage transaction including the second text to the blockchain network, where the evidence storage transaction can further include source information of the second text, for example, a publishing website, so that evidence is further stored in the blockchain network for infringement of the second text based on a blockchain-based tampering prevention mechanism.

Based on the process of obtaining the similarity between the second text and the target original text provided in some implementations of the present specification, similarities between a plurality of different second texts and the target original text can be sorted, so that corresponding infringement countermeasures, for example, notifying an infringer to immediately stop infringement, making a tort claim, or sending right sharing suggestion, are used based on different similarity rankings.

Figure 5:
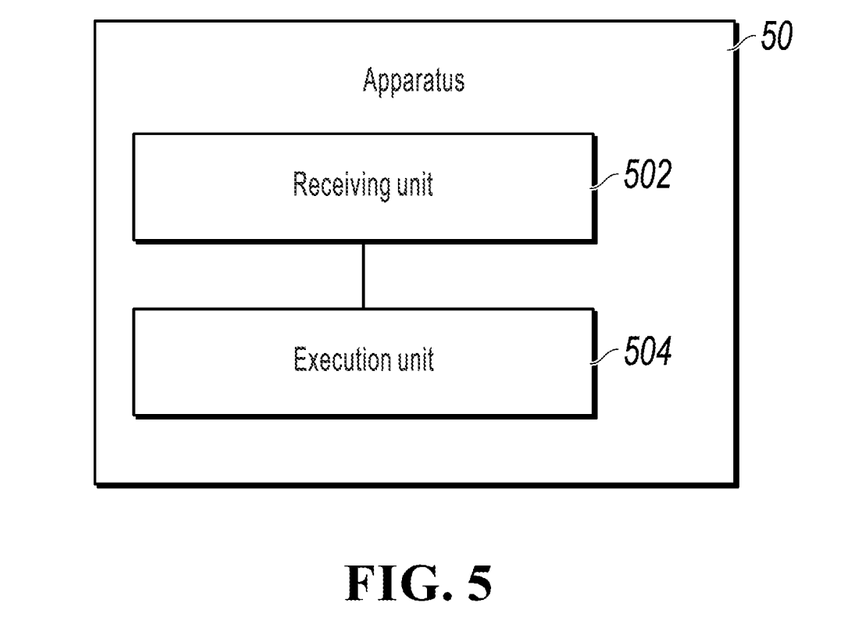
FIG. 5 is a schematic diagram illustrating a blockchain-based text similarity detection apparatus, according to an example implementation.

Corresponding to the previous procedure implementation, an implementation of the present specification further provides a blockchain-based text similarity detection apparatus 50. The apparatus 50 can be implemented by software, hardware, or a combination of hardware and software. Software implementation is used as an example. As a logical apparatus, the apparatus is formed by reading a corresponding computer program instruction in a memory and running the instruction by a central processing unit (CPU) in a device that the apparatus is located. In terms of hardware implementation, in addition to a CPU, a memory, and a storage shown in FIG. 6, the device that the apparatus is located generally further includes other hardware such as a chip for sending and receiving radio signals, and/or other hardware such as a card configured to implement a network communication function.

As shown in FIG. 5, the present specification further provides a blockchain-based text similarity detection apparatus 50, applied to a blockchain network in which a smart contract for detecting a similarity to a target original text is deployed, where the apparatus 50 is applied to a network node in the blockchain network, and includes the following: a receiving unit 502, configured to receive a first transaction including a first text, where the first text is a text whose similarity to the target original text is to be detected; and an execution unit 504, configured to invoke the smart contract, and execute text similarity detection logic stated in the smart contract, to obtain a detection result of similarity between the first text and the target original text.

In another shown implementation, the first text includes at least one first text unit of a predetermined length; the smart contract stores several target text vectors, and each target text vector is generated based on a target text unit of the predetermined length included in the target original text; and the executing text similarity detection logic stated in the smart contract includes the following: generating at least one first text vector for the at least one first text unit; calculating a distance between the at least one first text vector and each target text vector; and comparing the distance with a predetermined distance threshold, where when the distance is less than the predetermined distance threshold, a similarity detection result of the at least one first text unit is "similar", and the detection result of similarity between the first text and the target original text includes the similarity detection result of the at least one first text unit.

In another shown implementation, target text vector indices are generated for the several target text vectors in the smart contract.

In another shown implementation, the apparatus 50 further includes the following: an acquisition unit, configured to obtain a second text including at least one similar first text unit, where the similar first text unit is a first text unit whose similarity detection result is "similar"; a division unit, configured to divide the second text into a plurality of second text units of the predetermined length; a sending unit, configured to send a second transaction including the second text units to the blockchain network, to invoke the smart contract and execute the text similarity detection logic stated in the smart contract, to obtain a detection result of similarity between each second text and the target original text; and a calculation unit, configured to calculate a similarity between the second text and the target original text based on a second text unit whose similarity detection result is "similar".

In another shown implementation, the calculation unit is further configured to calculate a ratio of a content sum of second text units whose similarity detection results are "similar" to total content of the second text or a ratio of a content sum of second text units whose similarity detection results are "similar" to total content of the target original text, and use the ratio as the similarity between the second text and the target original text.

In another shown implementation, when the similarity between the second text and the target original text is greater than a predetermined similarity threshold, the sending unit is further configured to send an evidence storage transaction to the blockchain network, where the evidence storage transaction includes the second text and source information of the second text.

For a specific implementation process of functions of the units in the apparatus 50, references can be made to an implementation process of corresponding steps in the blockchain-based text similarity detection method performed by the blockchain network node. For related parts, references can be made to descriptions in the method implementation. Details are omitted here for simplicity.

The previously described apparatus implementation is merely an example. The units described as separate parts may or may not be physically separate, and parts displayed as units may or may not be physical modules, and may be located in one position, or may be distributed on a plurality of network modules. Some or all of the units or modules can be selected based on actual requirements to achieve the objectives of the solutions of the present specification. A person of ordinary skill in the art can understand and implement the implementations of the present specification without creative efforts.

The apparatuses, units, or modules described in the previous implementations can be implemented by a computer chip or an entity, or can be implemented by a product with a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet, a wearable device, or any combination of these devices.

Figure 6:
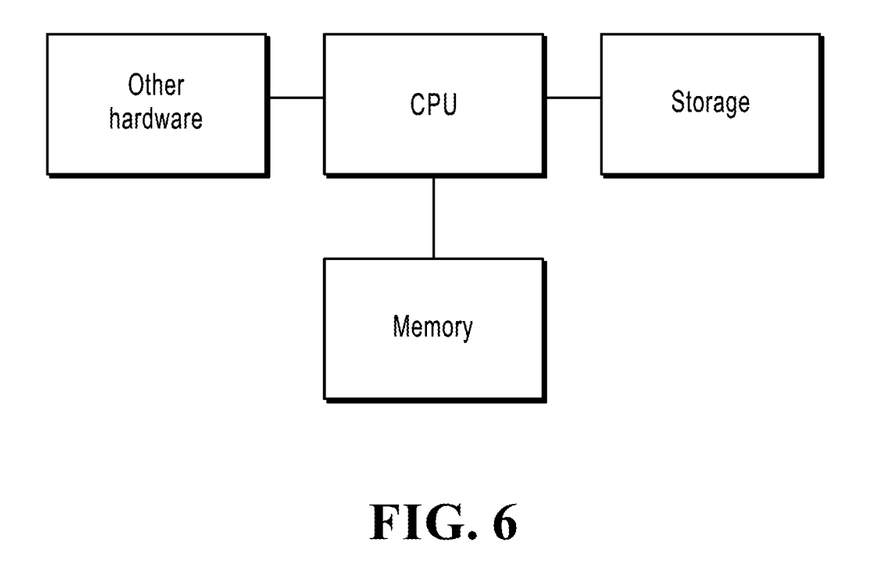
FIG. 6 is a structural diagram illustrating hardware running a blockchain-based text similarity detection apparatus implementation provided in the present specification.

Corresponding to the previous method implementations, an implementation of the present specification further provides a computer device. As shown in FIG. 6, the computer device includes a storage and a processor. The storage stores a computer program that can be run by the processor. When the processor runs the stored computer program, the steps in the blockchain-based text similarity detection method performed by the blockchain network node in some implementations of the present specification are performed. For a detailed description of the steps in the blockchain-based text similarity detection method performed by the blockchain network node, references can be made to the previously described content. Details are omitted for simplicity.

Corresponding to the previous method implementation, an implementation of the present specification further provides a computer-readable storage medium. The storage medium stores a computer program. When the computer program is run by a processor, the steps in the blockchain-based text similarity detection method performed by the blockchain network node in some implementations of the present specification are performed. For a detailed description of the steps in the blockchain-based text similarity detection method performed by the blockchain network node, references can be made to the previously described content. Details are omitted for simplicity.

The previous descriptions are merely preferred implementations of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method for detecting text similarity, comprising:
receiving, by a network node in a blockchain network, a first transaction comprising first text, wherein the first text is text whose similarity to a target original text is to be detected, wherein the first text comprises at least one first text unit of a predetermined length;
invoking, by the network node in the blockchain network, a smart contract deployed in the blockchain network for detecting a similarity to the target original text, wherein the smart contract stores several target text vectors, and each target text vector is generated based on a target text unit of the predetermined length comprised in the target original text;
executing, by the network node in the blockchain network, text similarity detection logic stated in the smart contract and obtaining a detection result of similarity between the first text and the target original text, wherein executing the text similarity detection logic stated in the smart contract comprises:
generating at least one first text vector for the at least one first text unit;
calculating a distance between the at least one first text vector and the each target text vector; and
comparing the distance with a predetermined distance threshold, wherein if the distance is less than the predetermined distance threshold, a similarity detection result of the at least one first text unit is "similar", and wherein the detection result of similarity between the first text and the target original text comprises the similarity detection result of the at least one first text unit;
obtaining a second text comprising at least one similar first text unit, wherein the similar first text unit is a first text unit whose similarity detection result is "similar";
dividing the second text into a plurality of second text units of the predetermined length;
sending a second transaction comprising the plurality of second text units to the blockchain network;
invoking the smart contract;
executing the text similarity detection logic stated in the smart contract and obtaining a detection result of similarity between each of the plurality of second text units and the target original text; and calculating a similarity between the second text and the target original text based on a second text unit whose similarity detection result is "similar".

2. The computer-implemented method of claim 1, wherein the smart contract generates target text vector indices for the several target text vectors.

3. The computer-implemented method of claim 1, wherein the calculating a similarity between the second text and the target original text based on a second text unit whose similarity detection result is "similar" comprises:
calculating a ratio, the ratio comprising a ratio of a content sum of second text units whose similarity detection results are "similar" to total content of the second text or a ratio of a content sum of second text units whose similarity detection results are "similar" to total content of the target original text, and
using the ratio as the similarity between the second text and the target original text.

4. The computer-implemented method of claim 1, wherein if the similarity between the second text and the target original text is greater than a predetermined similarity threshold, the method further comprises:
sending an evidence storage transaction to the blockchain network, wherein the evidence storage transaction comprises the second text and source information of the second text.

5. A computer-implemented system for detecting text similarity, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a network node in a blockchain network, a first transaction comprising first text, wherein the first text is text whose similarity to a target original text is to be detected, wherein the first text comprises at least one first text unit of a predetermined length;
invoking, by the network node in the blockchain network, a smart contract deployed in the blockchain network for detecting a similarity to the target original text, wherein the smart contract stores several target text vectors, and each target text vector is generated based on a target text unit of the predetermined length comprised in the target original text;
executing, by the network node in the blockchain network, text similarity detection logic stated in the smart contract and obtaining a detection result of similarity between the first text and the target original text, wherein executing the text similarity detection logic stated in the smart contract comprises:
generating at least one first text vector for the at least one first text unit;
calculating a distance between the at least one first text vector and the each target text vector; and
comparing the distance with a predetermined distance threshold, wherein if the distance is less than the predetermined distance threshold, a similarity detection result of the at least one first text unit is "similar", and wherein the detection result of similarity between the first text and the target original text comprises the similarity detection result of the at least one first text unit;
obtaining a second text comprising at least one similar first text unit, wherein the similar first text unit is a first text unit whose similarity detection result is "similar";
dividing the second text into a plurality of second text units of the predetermined length;
sending a second transaction comprising the plurality of second text units to the blockchain network;
invoking the smart contract;
executing the text similarity detection logic stated in the smart contract and obtaining a detection result of similarity between each of the plurality of second text units and the target original text; and
calculating a similarity between the second text and the target original text based on a second text unit whose similarity detection result is "similar".

6. The computer-implemented system of claim 5, wherein the smart contract generates target text vector indices for the several target text vectors.

7. The computer-implemented system of claim 5, wherein the calculating a similarity between the second text and the target original text based on a second text unit whose similarity detection result is "similar" comprises:
calculating a ratio, the ratio comprising a ratio of a content sum of second text units whose similarity detection results are "similar" to total content of the second text or a ratio of a content sum of second text units whose similarity detection results are "similar" to total content of the target original text, and
using the ratio as the similarity between the second text and the target original text.

8. The computer-implemented system of claim 5, wherein if the similarity between the second text and the target original text is greater than a predetermined similarity threshold, the operations further comprise:
sending an evidence storage transaction to the blockchain network, wherein the evidence storage transaction comprises the second text and source information of the second text.

9. A non-transitory, computer-readable medium storing one or more instructions executable by a computer system to perform operations for detecting text similarity, comprising:
receiving, by a network node in a blockchain network, a first transaction comprising first text, wherein the first text is text whose similarity to a target original text is to be detected, wherein the first text comprises at least one first text unit of a predetermined length;
invoking, by the network node in the blockchain network, a smart contract deployed in the blockchain network for detecting a similarity to the target original text, wherein the smart contract stores several target text vectors, and each target text vector is generated based on a target text unit of the predetermined length comprised in the target original text;
executing, by the network node in the blockchain network, text similarity detection logic stated in the smart contract and obtaining a detection result of similarity between the first text and the target original text, wherein executing the text similarity detection logic stated in the smart contract comprises:
generating at least one first text vector for the at least one first text unit;
calculating a distance between the at least one first text vector and the each target text vector; and
comparing the distance with a predetermined distance threshold, wherein if the distance is less than the predetermined distance threshold, a similarity detection result of the at least one first text unit is "similar", and wherein the detection result of similarity between the first text and the target original text comprises the similarity detection result of the at least one first text unit;

obtaining a second text comprising at least one similar first text unit, wherein the similar first text unit is a first text unit whose similarity detection result is "similar";

dividing the second text into a plurality of second text units of the predetermined length;

sending a second transaction comprising the plurality of second text units to the blockchain network;

invoking the smart contract;

executing the text similarity detection logic stated in the smart contract and obtaining a detection result of similarity between each of the plurality of second text units and the target original text; and calculating a similarity between the second text and the target original text based on a second text unit whose similarity detection result is "similar".

10. The non-transitory, computer-readable medium according to claim 9, wherein the smart contract generates target text vector indices for the several target text vectors.

11. The non-transitory, computer-readable medium according to claim 9, wherein the calculating a similarity between the second text and the target original text based on a second text unit whose similarity detection result is "similar" comprises:

calculating a ratio, the ratio comprising a ratio of a content sum of second text units whose similarity detection results are "similar" to total content of the second text or a ratio of a content sum of second text units whose similarity detection results are "similar" to total content of the target original text, and using the ratio as the similarity between the second text and the target original text.

12. The non-transitory, computer-readable medium according to claim 9, wherein if the similarity between the second text and the target original text is greater than a predetermined similarity threshold, the operations further comprise:

sending an evidence storage transaction to the blockchain network, wherein the evidence storage transaction comprises the second text and source information of the second text.

* * * * *